United States Patent
Tanaka et al.

(10) Patent No.: US 8,151,572 B2
(45) Date of Patent: Apr. 10, 2012

(54) METHOD OF STARTING AND STOPPING GAS TURBINE AND START-AND-STOP CONTROL DEVICE

(75) Inventors: Satoshi Tanaka, Takasago (JP); Hiroshi Tanabe, Takasago (JP); Yasuhiro Hashimoto, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 439 days.

(21) Appl. No.: 12/442,338

(22) PCT Filed: Sep. 19, 2007

(86) PCT No.: PCT/JP2007/068119
§ 371 (c)(1),
(2), (4) Date: Jun. 2, 2009

(87) PCT Pub. No.: WO2008/041478
PCT Pub. Date: Apr. 10, 2008

(65) Prior Publication Data
US 2009/0314001 A1 Dec. 24, 2009

(30) Foreign Application Priority Data
Sep. 28, 2006 (JP) ................................. 2006-264084

(51) Int. Cl.
*F02C 7/22* (2006.01)
*F02C 7/26* (2006.01)
(52) U.S. Cl. ............... 60/778; 60/779; 60/786; 60/790; 60/39.094
(58) Field of Classification Search ............... 60/39.094, 60/776, 778, 779, 786, 790, 39.465, 734
See application file for complete search history.

(56) References Cited

U.S. PATENT DOCUMENTS
3,691,759 A * 9/1972 Scheerer .................. 60/786
5,307,620 A * 5/1994 Hamahira et al. ............... 60/779
2001/0022080 A1 9/2001 Tanaka et al.

FOREIGN PATENT DOCUMENTS
JP 59-018240 A 1/1984
(Continued)

OTHER PUBLICATIONS
International Search Report of PCT/JP2007/068119, Mailing Date of Dec. 25, 2007.

*Primary Examiner* — Ted Kim
(74) *Attorney, Agent, or Firm* — Westerman, Hattori, Daniels & Adrian, LLP

(57) ABSTRACT

An object of the present invention is to provide a method of starting and stopping a gas turbine and a start-and-stop control device, which are capable of solving a problem of a failure in normally igniting a fuel gas due to a purge gas (nitrogen gas) remaining in a fuel gas pipe and thereby igniting the fuel gas stably. For this purpose, the start-and-stop control device performs control at the time of starting the gas turbine by sequentially performing: first exhaust gas duct purge for pushing out a fuel gas remaining in an exhaust gas duct with compressed air from a compressor; fuel gas pipe purge for pushing out nitrogen gas remaining in a fuel gas pipe between a fuel gas shutoff valve and a combustor at the time of stopping the gas turbine by the fuel gas by opening a fuel gas shutoff valve; and second exhaust gas duct purge for pushing out the fuel gas remaining in the exhaust gas duct at the time of the fuel gas pipe purge by the compressed air from the compressor, and then the fuel gas is supplied to the combustor by opening the fuel gas shutoff valve again and ignited.

2 Claims, 5 Drawing Sheets

FOREIGN PATENT DOCUMENTS

| | | |
|---|---|---|
| JP | 2-40937 U | 3/1990 |
| JP | 2001-214760 A | 8/2001 |

* cited by examiner

METHOD OF STARTING AND STOPPING GAS TURBINE AND START-AND-STOP CONTROL DEVICE

TECHNICAL FIELD

The present invention relates to a method of starting and stopping a gas turbine and a start-and-stop control device.

BACKGROUND ART

FIG. 4 is a view showing a conventional start-and-stop control device for a gas turbine and FIG. 5 is a view showing a starting sequence to be carried out by the start-and-stop control device.

As shown in FIG. 4, a gas turbine 1 includes a gas turbine body 2 together with a combustor 3, a compressor 4, an exhaust gas duct 5, a tachometer 13, a start-and-stop control device 14, and the like. A rotating shaft 6 of the compressor 4 is coupled with an unillustrated rotating shaft of the gas turbine body 2 and the compressor 4 compresses outside air (air) which is taken in by rotation together with the gas turbine body 2. The combustor 3 generates a combustion gas for rotating the gas turbine body 2 by combusting a fuel gas together by the compressed air supplied from the compressor 4, and supplies this combustion gas to the gas turbine body 2. The combustion gas after flowing through the gas turbine body 2 is discharged through the exhaust gas duct 5 provided in a rear portion of (on a downstream side of) the gas turbine body 2. This discharged combustion gas is subjected to heat recovery by an unillustrated heat recovery steam generator (HRGS) and is then emitted from an unillustrated stack to the atmosphere.

The tachometer 13 measures the number of revolutions of the gas turbine body 2 and outputs a signal of this measured number of revolutions to the start-and-stop control device 14. Meanwhile, a rotating shaft 8 of a power generator 7 is also connected to the rotating shaft 6 of the compressor 4. Therefore, the power generator 7 rotates together with the gas turbine body 2, and thereby generates power.

A tip end side (a downstream side) of a fuel gas pipe 9 is connected to the combustor 3 and a fuel gas shutoff valve 10 is provided in a mid portion of this fuel gas pipe 9. Meanwhile, a tip end side (a downstream side) of a nitrogen gas pipe 11 is connected to the fuel gas pipe 9 and a nitrogen gas shutoff valve 12 is provided in a mid portion of this nitrogen gas pipe 11. A base end side (an upstream side) of the nitrogen gas pipe 11 is connected to an unillustrated nitrogen gas supply device. Moreover, a base end side (an upstream side) of the fuel gas pipe 9 is connected to an unillustrated blast furnace in an iron works, and when the fuel gas shutoff valve 10 is opened, a blast furnace gas discharged from the blast furnace is supplied to the combustor 3 through the fuel gas pipe 9. That is, the blast furnace gas is used as the fuel gas in the gas turbine 1 of the illustrated example.

Moreover, this blast furnace gas contains carbon monoxide as a main component. Accordingly, when the gas turbine 1 is stopped for periodic inspection or the like, it is necessary to purge the uncombusted fuel gas (blast furnace gas) that remains in the gas turbine body 2 and the like. Moreover, when the gas turbine 1 is started, if the uncombusted fuel gas (blast furnace gas) remains in the exhaust gas duct 5 and the like, there is a risk that the fuel gas is heated by the combustion gas and is combusted inside the exhaust gas duct 5 and the like. Accordingly, it is necessary to purge the fuel gas, before starting the supply of the fuel gas to the combustor 3 and performing ignition. For this reason, the start-and-stop control device 14 performs the following gas turbine stop control and gas turbine start control.

<Gas Turbine Stop Control>

Although illustration is omitted (see FIG. 2), in stopping the gas turbine, the fuel gas shutoff valve 10 is closed, and then the nitrogen gas shutoff valve 12 is opened just for a predetermined time period. As a result, the uncombusted fuel gas remaining in the fuel gas pipe 9, the combustor 3, the gas turbine body 2, and the exhaust gas duct 5 is pushed out by the nitrogen gas that is supplied from the nitrogen gas supply device through the nitrogen gas pipe 11.

<Gas Turbine Start Control>

On the other hand, in starting the gas turbine, the gas turbine body 2 is accelerated until reaching the number N of revolutions for ignition (such as 600 rpm) as shown in FIG. 5 by rotation driving means (not shown) such as an auxiliary motor and is maintained at this number N of revolutions for ignition. At this time, since the compressor 4 is also rotated with the gas turbine body 2, the air compressed by this compressor 4 will flow into the combustor 3, the gas turbine body 2, and the exhaust gas duct 5.

Accordingly, when the start-and-stop control device 14 judges that the number of revolutions of the gas turbine body 2 rotated and driven by the rotation driving means reaches the number N of revolutions for ignition at a time point T1 based on a signal of this measured number of revolutions from the tachometer 13, a closed state of the fuel gas shutoff valve 10 is maintained from this point until a predetermined time period ΔT (a period until a time point T2) passes. As a result, when the uncombusted fuel gas remains inside the gas turbine 1 (such as the exhaust gas duct 5), the remaining fuel gas is pushed out by the compressed air from the compressor 4 which is rotating at the number N of revolutions for ignition together with the gas turbine body 2. That is, exhaust gas duct purge is carried out. Here, a judgment as to whether or not the predetermined time period ΔT has passed is made by a timer included in the start-and-stop control device 14.

Thereafter, when judging that the predetermined time period ΔT has passed at the time point T2, the start-and-stop control device 14 supplies the fuel gas to the combustor 3 by opening the fuel gas shutoff valve 10 and performs ignition with an ignition plug. Accordingly, the gas turbine body 2 is rotated and driven by the combustion gas generated by the combustor 3 thereafter and is accelerated until reaching a rated number of revolutions (such as 3600 rpm).

Here, the following is a prior art document describing the purge of the uncombusted fuel.
Patent Document 1: JP-A 59-18240

DISCLOSURE OF THE INVENTION

Problem to be Solved by the Invention

The above-described conventional start-and-stop control device 14 performs only the exhaust gas duct purge at the time of starting the gas turbine. Accordingly, although it is possible to purge the uncombusted fuel gas remaining in a portion such as the exhaust gas duct 5 where the compressed air flows, it is not possible to purge the nitrogen gas remaining in the fuel gas pipe 9 between the fuel gas shutoff valve 10 and the combustor 3.

Moreover, in an attempt to perform ignition by supplying the fuel gas to the combustor 3 by opening the fuel gas shutoff valve 10 in the state of the nitrogen gas remaining in the fuel gas pipe 9, there is a case of an ignition failure due to an extremely low proportion of the fuel gas. In particular, when a low-calorie gas such as the blast furnace gas is used as the fuel gas, it is necessary to increase a blast furnace gas flow rate by enlarging a diameter of the fuel gas pipe 9 in order to obtain a predetermined amount of calories. Accordingly, the amount of the nitrogen gas remaining in the fuel gas pipe 9 at the time of stopping the gas turbine is also increased. For this reason, there are many cases where ignition is unsuccessful due to the extremely low proportion of the fuel gas.

Accordingly, in view of the above-mentioned circumstance, it is an object of the present invention to provide a method of starting and stopping a gas turbine and a start-and-stop control device, which are capable of solving a problem of a failure in igniting a combustion gas normally due to a purge gas (nitrogen gas) remaining in a fuel gas pipe and thereby igniting the fuel gas stably.

Means for Solving the Problem

To solve the problem, a method of starting and stopping a gas turbine of a first invention is a method of starting and stopping a gas turbine, the gas turbine including: a gas turbine body; an exhaust gas duct provided on a downstream side of the gas turbine body; a combustor for generating a combustion gas for rotating the gas turbine body by combusting a fuel gas together with compressed air; a fuel gas pipe connected to the combustor; a fuel gas shutoff valve provided on the fuel gas pipe; a purge gas pipe connected to the fuel gas pipe between this fuel gas shutoff valve and the combustor; a purge gas shutoff valve provided on the purge gas pipe; and a compressor for supplying the compressed air to the combustor by rotating together with the gas turbine body, the method characterized by comprising:

at the time of stopping the gas turbine, pushing out the combustion gas remaining in the fuel gas pipe, the combustor, the gas turbine body, and the exhaust gas duct by a purge gas by opening the purge gas shutoff valve for a predetermined time period after closure of the fuel gas shutoff valve;

at the time of starting the gas turbine, supplying the fuel gas to the combustor with the fuel gas shutoff valve being opened again so as to ignite the fuel gas, after sequentially performing first exhaust gas duct purge for pushing out the fuel gas remaining in the exhaust gas duct by the compressed air from the compressor until a first predetermined time period passes after the number of revolutions of the gas turbine body accelerated by rotation driving means reaches a predetermined number of revolutions for ignition, fuel gas pipe purge, by the fuel gas, for pushing out the purge gas remaining in the fuel gas pipe between the fuel gas shutoff valve and the combustor at the time of stopping the gas turbine by opening the fuel gas shutoff valve for a second predetermined time period after the first predetermined time period passes, and second exhaust gas duct purge for pushing out the fuel gas remaining in the exhaust gas duct after the fuel gas pipe purge by the compressed air from the compressor for a third predetermined time period after the second predetermined time period passes.

Meanwhile, a start-and-stop control device for a gas turbine of a second invention is a start-and-stop control device for a gas turbine, the gas turbine including: a gas turbine body; an exhaust gas duct provided on a downstream side of the gas turbine body; a combustor for generating a combustion gas for rotating the gas turbine body by combusting a fuel gas together with compressed air; a fuel gas pipe connected to the combustor; a fuel gas shutoff valve provided on the fuel gas pipe; a purge gas pipe connected to the fuel gas pipe between this fuel gas shutoff valve and the combustor; a purge gas shutoff valve provided on the purge gas pipe; and a compressor for supplying the compressed air to the combustor by rotating together with the gas turbine body, the start-and-stop control device characterized in that at the time of stopping the gas turbine, the combustion gas remaining in the fuel gas pipe, the combustor, the gas turbine body, and the exhaust gas duct is pushed out with a purge gas by opening the purge gas shutoff valve for a predetermined time period after closure of the fuel gas shutoff valve; and at the time of starting the gas turbine, the fuel gas is supplied to the combustor by opening the fuel gas shutoff valve again and ignited, after sequentially performing first exhaust gas duct purge for pushing out the fuel gas remaining in the exhaust gas duct by the compressed air from the compressor until a first predetermined time period passes after the number of revolutions of the gas turbine body accelerated by rotation driving means reaches a predetermined number of revolutions for ignition, fuel gas pipe purge, by the fuel gas, for pushing out the purge gas remaining in the fuel gas pipe between the fuel gas shutoff valve and the combustor at the time of stopping the gas turbine by opening the fuel gas shutoff valve for a second predetermined time period after the first predetermined time period passes, and second exhaust gas duct purge for pushing out the fuel gas remaining in the exhaust gas duct after the fuel gas pipe purge by the compressed air from the compressor for a third predetermined time period after the second predetermined time period passes.

EFFECTS OF THE INVENTION

According to the method of starting and stopping a gas turbine of the first invention or the start-and-stop control device for a gas turbine of the second invention, the fuel gas pipe purge for pushing out, by the fuel gas, the purge gas remaining in the fuel gas pipe between the fuel gas shutoff valve and the combustor is performed at the time of stopping the gas turbine, and it is therefore possible to solve a conventional problem of a failure in normally igniting the combustion gas due to the purge gas (nitrogen gas) remaining in the fuel gas pipe and thereby to ignite the fuel gas stably.

Moreover, in addition to the first exhaust gas duct purge for pushing out the fuel gas remaining in the exhaust gas duct at the time of stopping the gas turbine by the compressed air from the compressor, the second exhaust gas duct purge for pushing out the fuel gas remaining in the exhaust gas duct by the compressed air from the compressor at the time of the fuel gas pipe purge is also performed. Accordingly, even when the fuel gas flows and remains in the gas turbine body and the exhaust gas duct at the time of fuel gas pipe purge, it is also possible to prevent combustion of the fuel gas inside the exhaust gas duct and the like.

DESCRIPTION OF SYMBOLS

21 GAS TURBINE
22 GAS TURBINE BODY
23 COMBUSTOR
24 COMPRESSOR
25 EXHAUST GAS DUCT
26 ROTATING SHAFT
27 POWER GENERATOR
28 ROTATING SHAFT
29 FUEL GAS PIPE
30 FUEL GAS SHUTOFF VALVE
31 NITROGEN GAS PIPE
32 NITROGEN GAS SHUTOFF VALVE
33 TACHOMETER
34 START-AND-STOP CONTROL DEVICE

BEST MODE FOR CARRYING OUT THE INVENTION

Now, an embodiment of the present invention will be described below in detail based on the drawings.

Figure 1:
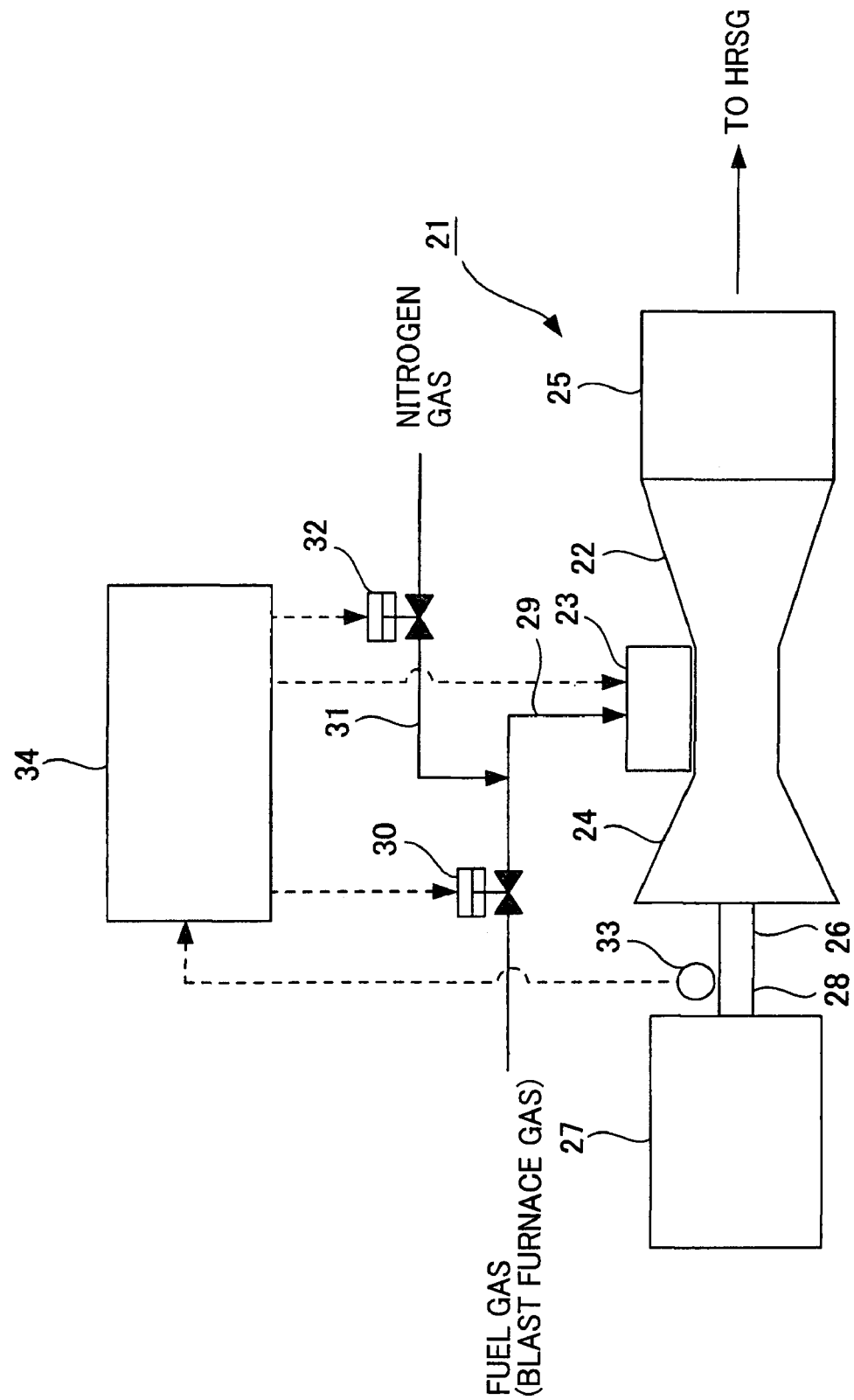
FIG. 1 is a view showing a start-and-stop control device for a gas turbine according to an embodiment of the present invention.
Figure 2:
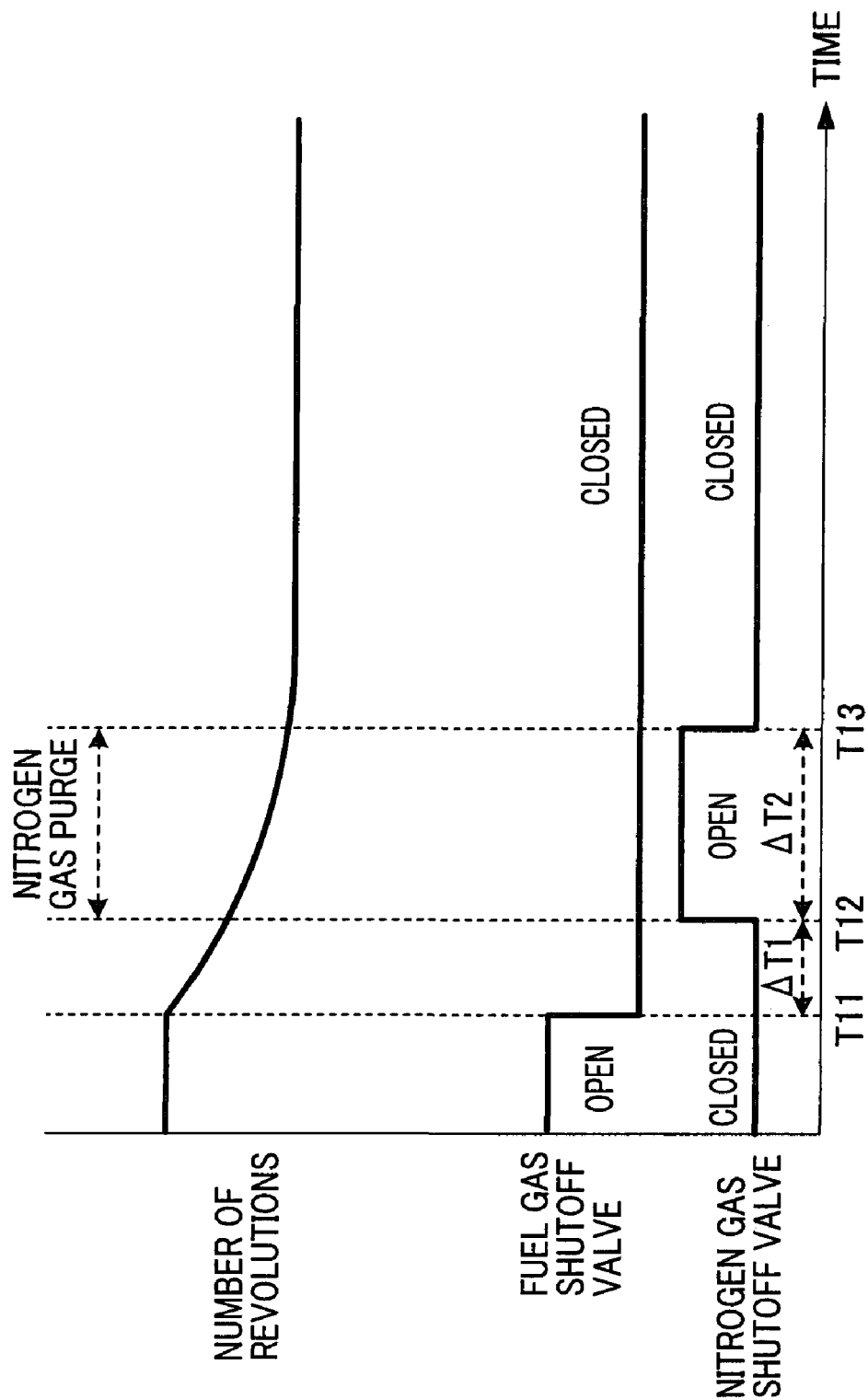
FIG. 2 is a view showing a stopping sequence to be carried out by the start-and-stop control device.
Figure 3:
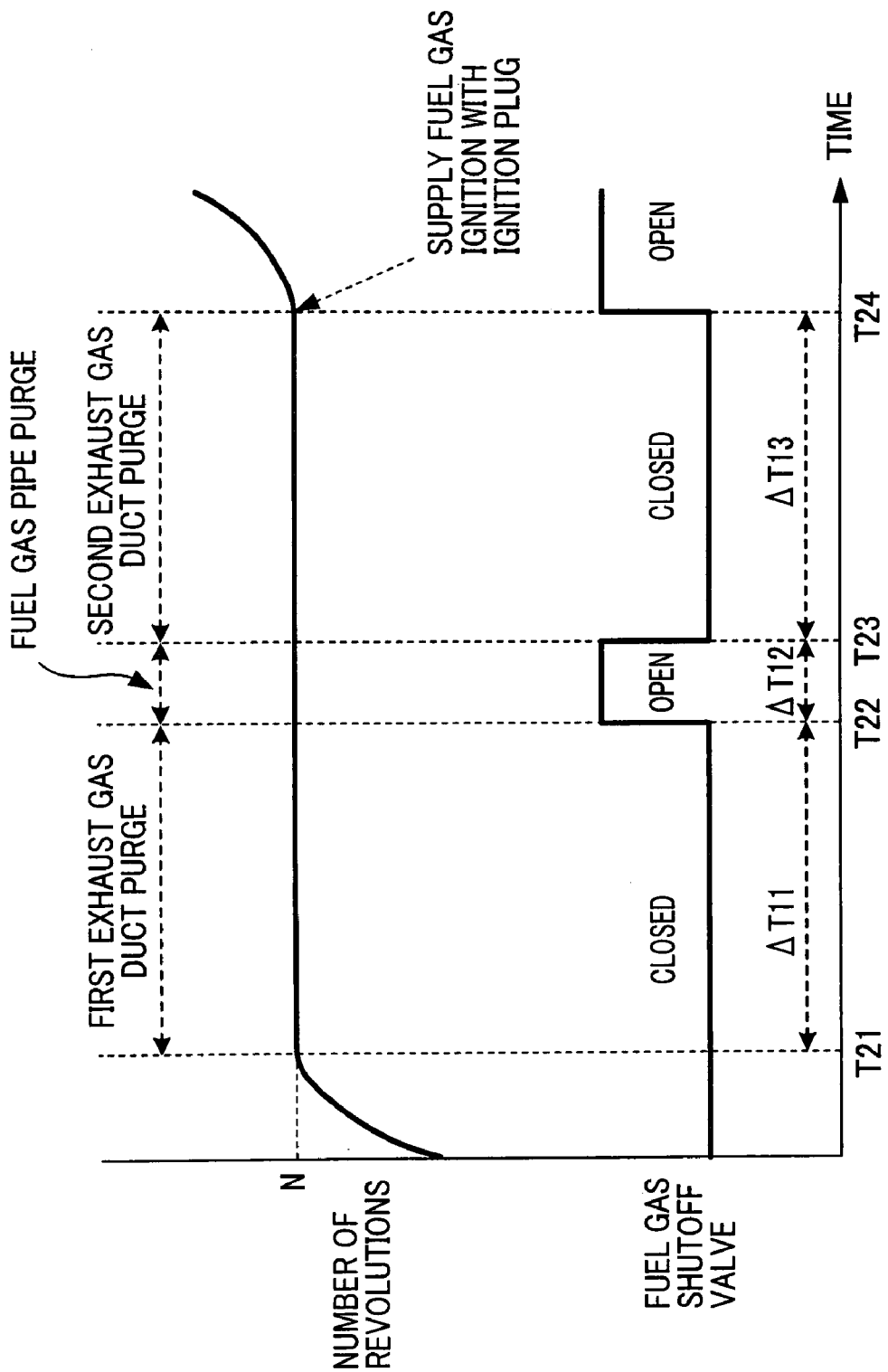
FIG. 3 is a view showing a starting sequence to be carried out by the start-and-stop control device.
Figure 4:
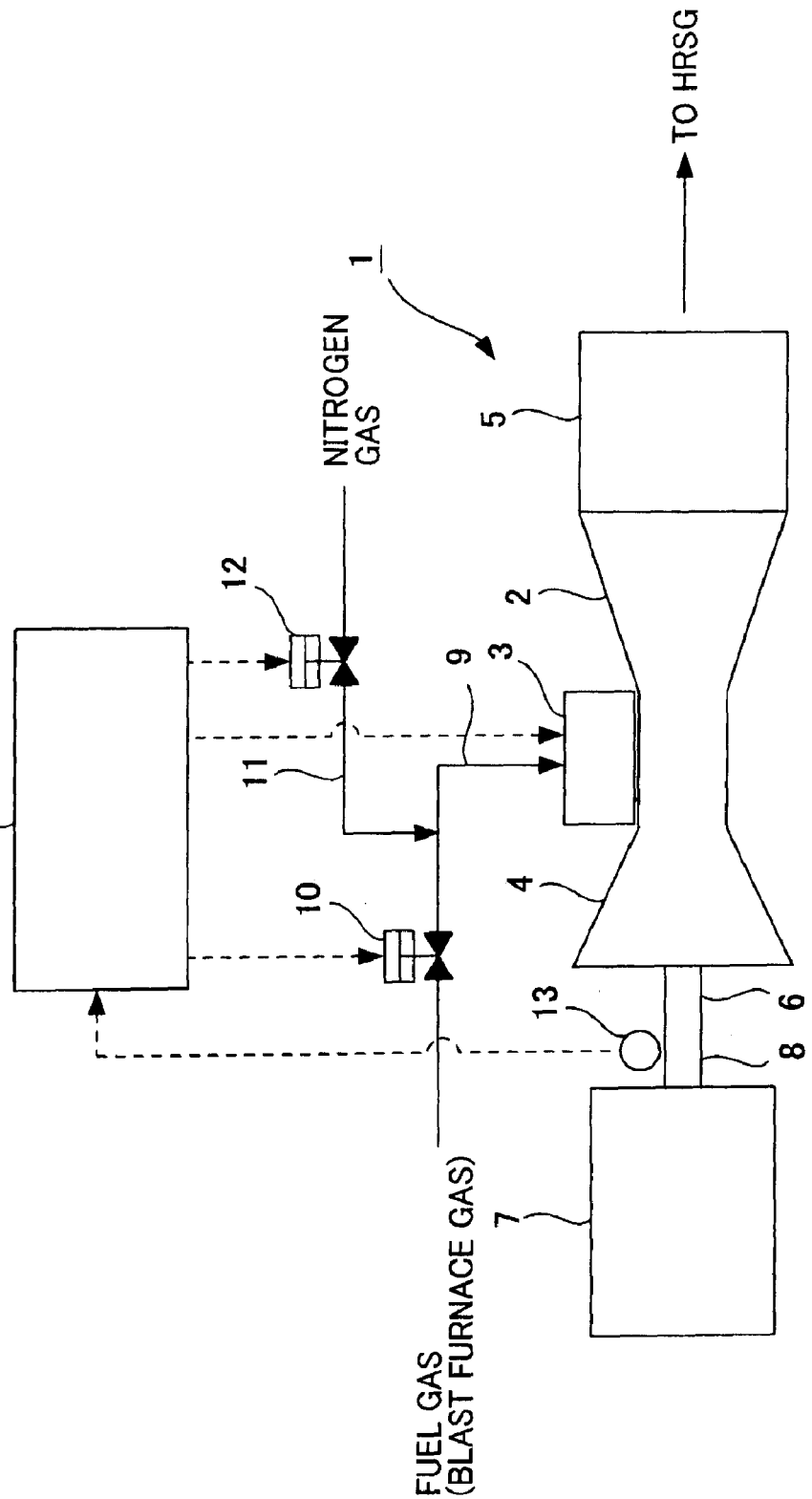
FIG. 4 is a view showing a conventional start-and-stop control device for a gas turbine.
Figure 5:
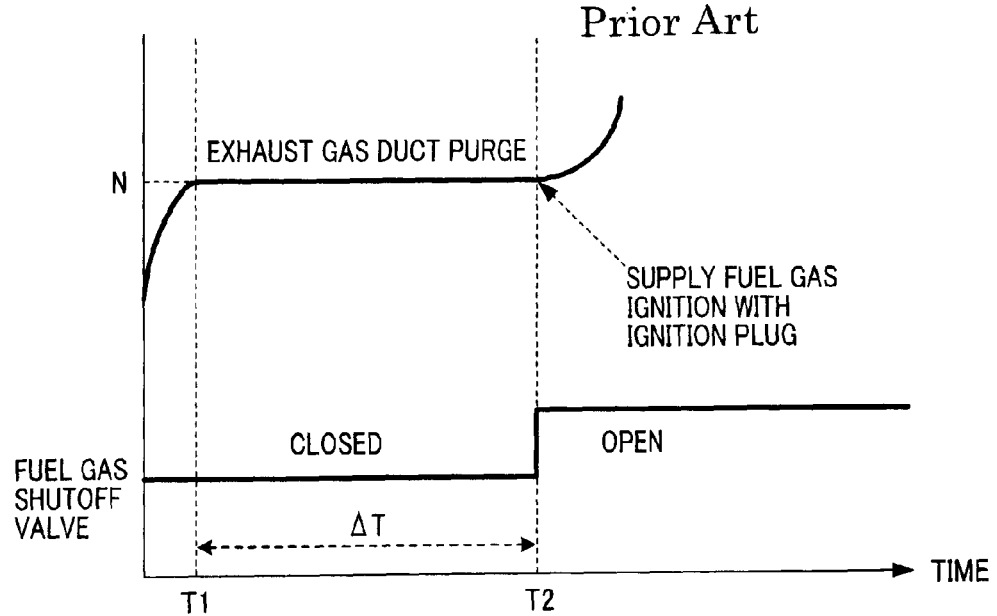
FIG. 5 is a view showing a starting sequence to be carried out by the start-and-stop control device.

FIG. 1 is a view showing a start-and-stop control device for a gas turbine according to an embodiment of the present invention, FIG. 2 is a view showing a stopping sequence to be carried out by the start-and-stop control device, and FIG. 3 is a view showing a starting sequence to be carried out by the start-and-stop control device.

As shown in FIG. 1, a gas turbine 21 includes a gas turbine body 22 together with a combustor 23, a compressor 24, an exhaust gas duct 25, a tachometer 33, a start-and-stop control device 34, and the like as similar to the prior art. A rotating shaft 26 of the compressor 24 is coupled with an unillustrated rotating shaft of the gas turbine body 22 and the compressor 24 compresses outside air (air) which is taken in by rotation together with the gas turbine body 22. The combustor 23 generates a combustion gas for rotating the gas turbine body 22 by combusting a fuel gas together with the compressed air supplied from the compressor 24, and supplies this combustion gas to the gas turbine body 22. The combustion gas after flowing through the gas turbine body 22 is discharged through the exhaust gas duct 25 provided in the rear portion of (on a downstream side of) the gas turbine body 22. This discharged combustion gas is subjected to heat recovery by an unillustrated heat recovery steam generator (HRGS) and is then emitted from an unillustrated stack to the atmosphere.

Moreover, although illustration is omitted, the gas turbine 21 is also equipped with rotation driving means for accelerating the gas turbine body 22 prior to ignition of the fuel gas as similar to the prior art. This rotation driving means may be an auxiliary motor, a power generator 27 or a steam turbine, for example. When using the auxiliary motor as the rotation driving means, the gas turbine body 22 is rotated and driven by the auxiliary motor having a rotating shaft which is detachably coupled with the rotating shaft of the gas turbine body 22. When using the power generator 27 as the rotation driving means, the gas turbine body 22 is rotated and driven by causing the power generator 27 to function as a motor. When the steam turbine is used as the rotation driving means, the gas turbine body 22 is rotated by rotating the steam turbine having a rotating shaft coupled with the rotating shaft of the gas turbine body 22 by using auxiliary steam generated by an auxiliary boiler or the like.

The tachometer 33 measures the number of revolutions of the gas turbine body 22 and outputs a signal of this measured number of revolutions to the start-and-stop control device 34. Meanwhile, a rotating shaft 28 of the power generator 27 is also connected to the rotating shaft 26 of the compressor 24. Therefore, the power generator 27 rotates together with the gas turbine body 22 and generates power.

A tip end side (a downstream side) of a fuel gas pipe 29 is connected to the combustor 23 and a fuel gas shutoff valve 30 is provided in a mid portion of this fuel gas pipe 29. Meanwhile, a tip end side (a downstream side) of a nitrogen gas pipe 31 is connected to the fuel gas pipe 29 (between the fuel gas shutoff valve 30 and the combustor 23) and a nitrogen gas shutoff valve 32 is provided in a mid portion of this nitrogen gas pipe 31. A base end side (an upstream side) of the nitrogen gas pipe 31 is connected to an unillustrated nitrogen gas supply device. Moreover, a base end side (an upstream side) of the fuel gas pipe 29 is connected to an unillustrated blast furnace in an iron works, and when the fuel gas shutoff valve 30 is opened, a blast furnace gas discharged from the blast furnace is supplied to the combustor 23 through the fuel gas pipe 29. That is, the blast furnace gas is used as the fuel gas in the gas turbine 21 of the illustrated example.

Moreover, this blast furnace gas contains carbon monoxide as a main component. Accordingly, when the gas turbine 21 is stopped for periodic inspection or the like, it is necessary to purge the uncombusted fuel gas (blast furnace gas) out of the gas turbine body 22 and the like. Specifically, if an opening operation is conducted in the state of the fuel gas remaining in the gas turbine 21 (such as the combustor 23) without purging remaining gas with the nitrogen gas at the time of stopping the gas turbine, there is a risk that an operator inhales the hazardous fuel gas. For this reason, in stopping the gas turbine, it is necessary to establish a state to allow the operator to conduct the opening operation by purging the remaining fuel gas with the nitrogen gas. Meanwhile, it is also necessary to purge the remaining fuel gas with a compressed air at the time of starting the gas turbine. As for a case in which the remaining fuel gas exists in the gas turbine 21 at the time of starting the gas turbine, a case where ignition of the fuel gas was unsuccessful in a previous starting session (the introduced fuel gas remains inside the gas turbine 21 if the fuel gas is introduced but not ignited) is conceivable. In such state, if the fuel gas is introduced to the combustor 23 and ignited, and whereby the high-temperature combustion gas flows, there is a risk of spontaneous combustion of the remaining fuel gas inside the gas turbine 21. Therefore, at the time of starting the gas turbine, it is also necessary to start supplying the fuel gas to the combustor 23 and then to perform ignition after purging the fuel gas which is likely to remain inside the gas turbine 21 (for example, in the exhaust gas duct 25) with a compressed air. Furthermore, it is also necessary to purge the nitrogen gas that remains in the fuel gas pipe 29 in order to achieve stable ignition of the fuel gas. For this reason, the start-and-stop device 34 performs the following gas turbine stop control and gas turbine start control.

<Gas Turbine Stop Control>

As shown in FIG. 2, in stopping the gas turbine, the fuel gas shutoff valve 30 is closed at a time point T11, for example. As a result, the supply of the combustion gas (the blast furnace gas) to the combustor 23 is shut off and the gas turbine 21 is stopped. That is, rotation of the gas turbine body 22 is reduced as shown in the illustrated example. Thereafter, when a judgment is made that a predetermined time period Δ1 has passed at a time point T12, the nitrogen gas shutoff valve 32 is opened from this point until a predetermined time period ΔT2 (a period until a time point T3) passes. As a result, the uncombusted fuel gas remaining in the fuel gas pipe 29, the combustor 23, the gas turbine body 22, and the exhaust gas duct 25 is pushed out by the nitrogen gas (flows out together with the nitrogen gas), which is supplied from the nitrogen gas supply device through the nitrogen gas pipe 31.

<Gas Turbine Start Control>

On the other hand, in starting the gas turbine, the gas turbine body 22 is accelerated until reaching the number N of revolutions for ignition as shown in FIG. 3 by the rotation driving means and is maintained at this number N of revolutions for ignition. At this time, since the compressor 24 is also rotated with the gas turbine body 22, the air compressed by this compressor 24 will flow into the combustor 23, the gas turbine body 22, and the exhaust gas duct 25.

Accordingly, when the start-and-stop control device 34 judges that the number of revolutions of the gas turbine body 22 rotated and driven by the rotation driving means reaches the number N of revolutions for ignition at a time point T21 based on a signal of this measured number of revolutions from the tachometer 33, a closed state of the fuel gas shutoff valve 30 is maintained for a period (a period until reaching a time point T22) from this point until a first predetermined time period $\Delta T11$ (such as 10 minutes) passes.

As a result, when the uncombusted fuel gas remains inside the gas turbine 21 (for example, in the exhaust gas duct 25), the remaining fuel gas is pushed out by the compressed air (flows out together with the compressed air) from the compressor 24 which is rotating at the number N of revolutions for ignition together with the gas turbine body 22. That is, first exhaust gas duct purge is carried out. Naturally, if the uncombusted fuel gas remains in the combustor 23, the gas turbine body 22, and the like, the fuel gas therein will be also pushed out by the compressed air (flows out together with the compressed air).

Here, means for judging whether or not the number of revolutions of the gas turbine body 22 reaches the number N of revolutions for ignition is not limited to means based on a signal of this measured number of revolutions from the tachometer 33 and other judging means is also applicable. For example, in the case of accelerating the gas turbine body 22 in response to a given acceleration instruction signal (an instruction value for the number of revolutions), it is also possible to judge that the number of revolutions of the gas turbine body 22 reaches the number N of revolutions for ignition when this acceleration instruction value (the instruction value for the number of revolutions) reaches the number N of revolutions for ignition.

Next, when a judgment is made that the predetermined time period $\Delta T11$ has passed at the time point T22, the fuel gas shutoff valve 30 is opened for a period (a period until a time point T23) from this point until a second predetermined time period $\Delta T12$ (such as 10 seconds) passes. As a result, the nitrogen gas remaining in the fuel gas pipe 29 between the fuel gas shutout valve 30 and the combustor 23 at the time of stopping the gas turbine is pushed out (flows out together with the fuel gas) by the fuel gas (the blast furnace gas) supplied from the blast furnace. That is, fuel gas pipe purge is carried out.

Meanwhile, in this fuel gas pipe purge, there is also a possibility that the fuel gas flows into the gas turbine body 22 and the exhaust gas duct 25. Accordingly, the fuel gas supply is not started immediately after the fuel gas pipe purge. Instead, the fuel gas purge is started after a while.

Specifically, when a judgment is made that the second predetermined time period $\Delta T12$ has passed at the time point T23, the closed state of the fuel gas shutoff valve 30 is maintained for a period (a period until a time point T24) from this point until a third predetermined time period $\Delta T13$ (such as 10 minutes) passes. As a result, the fuel gas remaining in the exhaust gas duct 25 or the like at the time of the fuel gas pipe purge is pushed out by the compressed air (flows out together with the compressed air) from the compressor 24 which is rotating at the number N of revolutions for ignition together with the gas turbine body 22. That is, second exhaust gas duct purge is carried out. Naturally, if the blown fuel gas remains in the combustor 23, the gas turbine body 22, and the like, the fuel gas therein will be also pushed out by the compressed air (flows out together with the compressed air).

Thereafter, when the start-and-stop control device 34 judges that the third predetermined time period $\Delta T13$ has passed at the time point T24, the fuel gas is supplied to the combustor 23 by reopening the fuel gas shutoff valve 30 which was once closed at the time point T23 and is then ignited with a ignition plug. Therefore, from this time on, the gas turbine body 22 is rotated and driven by the combustion gas to be generated by the combustor 23 and is accelerated until reaching a rated number of revolutions (such as 3600 rpm). Here, the judgment as to whether or not each of the predetermined time periods $\Delta T1$, $\Delta T2$, $\Delta T11$, $\Delta T12$, and $\Delta T13$ has passed is made by a timer included in the start-and-stop control device 34. Meanwhile, at the time of starting and operating the gas turbine, the nitrogen gas shutoff valve 32 always remains in the closed state.

As described above, the start-and-stop control device 34 of this embodiment is characterized by performing control by: at the time of stopping the gas turbine, pushing out the combustion gas remaining in the fuel gas pipe 29, the combustor 23, the gas turbine body 22, and the exhaust gas duct 25 with the nitrogen gas by opening the nitrogen gas shutoff valve 32 just for the predetermined time period $\Delta T2$ after closure of the fuel gas shutoff valve 30; and, at the time of starting the gas turbine, sequentially performing the first exhaust gas duct purge for pushing out the fuel gas remaining in the exhaust gas duct 25 and the like by the compressed air from the compressor 24 until a first predetermined time period passes after the number of revolutions of the gas turbine body 22 accelerated by the rotation driving means reaches the predetermined number N of revolutions for ignition, the fuel gas pipe purge for pushing out the nitrogen gas remaining in the fuel gas pipe 29 between the fuel gas shutoff valve 30 and the combustor 23 at the time of stopping the gas turbine by the fuel gas by opening the fuel gas shutoff valve 30 for the second predetermined time period $\Delta T12$ after the first predetermined time period $\Delta T11$ passes, and the second exhaust gas duct purge for pushing out the fuel gas remaining in the exhaust gas duct 25 and the like by the compressed air from the compressor 24 for the third predetermined time period $\Delta T13$ after the second predetermined time period $\Delta T12$ passes and then supplying the fuel gas to the combustor 23 by opening the fuel gas shutoff valve 30 again to perform ignition. Accordingly, the following operations and effects are obtained.

Specifically, the start-and-stop control device 34 of this embodiment performs the fuel gas pipe purge for pushing out the nitrogen gas that remains in the fuel gas pipe 29 between the fuel gas shutoff valve 30 and the combustor 23 at the time of stopping the gas turbine. Therefore, it is possible to solve a problem of a failure in igniting normally the fuel gas due to the nitrogen gas remaining in the fuel gas pipe as observed in the prior art and thereby to ignite the fuel gas stably.

Moreover, in addition to the first exhaust gas duct purge for pushing out the fuel gas remaining in the exhaust gas duct 25 and the like at the time of stopping the gas turbine by the compressed air from the compressor 24, the second exhaust gas duct purge is also performed for pushing out the fuel gas remaining in the exhaust gas duct 25 and the like at the time of the fuel gas pipe purge by the compressed air from the compressor 24. Accordingly, if the fuel gas flows and remains in the gas turbine body 22 or the exhaust gas duct 25 at the time of the fuel gas pipe purge, it is also possible to prevent the fuel gas from combustion inside the exhaust gas duct 25 and the like.

Here, the case of using the blast furnace gas as the fuel gas has been described above. However, the fuel gas is not limited to the blast furnace gas. The present invention is applicable to a gas turbine using a fuel gas (such as a converter gas in iron works) that requires the purge of the remaining fuel gas with the purge gas (the nitrogen gas) at the time of stopping the gas turbine.

Meanwhile, each of the predetermined time periods $\Delta T11$, $\Delta T12$, $\Delta T13$, and the like may be appropriately determined by performing calculation or a test of the time for purging the remaining fuel gas or the remaining nitrogen gas based on the volume of the exhaust gas duct 25, the fuel gas pipe 29, and the like, the gas flow rate, or the like.

Industrial Applicability

The present invention relates to a method of starting and stopping a gas turbine and a start-and-stop control device, which is useful for application to a gas turbine using a fuel gas such as a blast furnace gas that requires purge of remaining fuel gas with a purge gas (nitrogen gas) at the time of stopping the gas turbine.

The invention claimed is:

1. A method of starting and stopping a gas turbine, the gas turbine including: a gas turbine body; an exhaust gas duct provided on a downstream side of the gas turbine body; a combustor for generating a combustion gas for rotating the gas turbine body by combusting a fuel gas together with compressed air; a fuel gas pipe connected to the combustor; a fuel gas shutoff valve provided on the fuel gas pipe; a purge gas pipe connected to the fuel gas pipe between this fuel gas shutoff valve and the combustor; a purge gas shutoff valve provided on the purge gas pipe; and a compressor for supplying the compressed air to the combustor by rotating together with the gas turbine body, the method characterized by comprising:
at the time of stopping the gas turbine, pushing out the fuel gas remaining in the fuel gas pipe, the combustor, the gas turbine body, and the exhaust gas duct by a purge gas by opening the purge gas shutoff valve for a predetermined time period after closure of the fuel gas shutoff valve;
at the time of starting the gas turbine, supplying the fuel gas to the combustor with the fuel gas shutoff valve being opened again so as to ignite the fuel gas, after sequentially performing
first exhaust gas duct purge for pushing out the fuel gas remaining in the exhaust gas duct by the compressed air from the compressor until a first predetermined time period passes after the number of revolutions of the gas turbine body accelerated by rotation driving means reaches a predetermined number of revolutions for ignition,
fuel gas pipe purge, by the fuel gas, for pushing out the purge gas remaining in the fuel gas pipe between the fuel gas shutoff valve and the combustor at the time of stopping the gas turbine by opening the fuel gas shutoff valve for a second predetermined time period after the first predetermined time period passes, and
second exhaust gas duct purge for pushing out the fuel gas remaining in the exhaust gas duct after the fuel gas pipe purge by the compressed air from the compressor for a third predetermined time period after the second predetermined time period passes.

2. A start-and-stop control device for a gas turbine, the gas turbine including: a gas turbine body; an exhaust gas duct provided on a downstream side of the gas turbine body; a combustor for generating a combustion gas for rotating the gas turbine body by combusting a fuel gas together with compressed air; a fuel gas pipe connected to the combustor; a fuel gas shutoff valve provided on the fuel gas pipe; a purge gas pipe connected to the fuel gas pipe between this fuel gas shutoff valve and the combustor; a purge gas shutoff valve provided on the purge gas pipe; and a compressor for supplying the compressed air to the combustor by rotating together with the gas turbine body, the start-and-stop control device characterized in that
at the time of stopping the gas turbine, the fuel gas remaining in the fuel gas pipe, the combustor, the gas turbine body, and the exhaust gas duct is pushed out with a purge gas by opening the purge gas shutoff valve for a predetermined time period after closure of the fuel gas shutoff valve; and
at the time of starting the gas turbine, the fuel gas is supplied to the combustor by opening the fuel gas shutoff valve again and ignited, after sequentially performing
first exhaust gas duct purge for pushing out the fuel gas remaining in the exhaust gas duct by the compressed air from the compressor until a first predetermined time period passes after the number of revolutions of the gas turbine body accelerated by rotation driving means reaches a predetermined number of revolutions for ignition,
fuel gas pipe purge, by the fuel gas, for pushing out the purge gas remaining in the fuel gas pipe between the fuel gas shutoff valve and the combustor at the time of stopping the gas turbine by opening the fuel gas shutoff valve for a second predetermined time period after the first predetermined time period passes, and
second exhaust gas duct purge for pushing out the fuel gas remaining in the exhaust gas duct after the fuel gas pipe purge by the compressed air from the compressor for a third predetermined time period after the second predetermined time period passes.

* * * * *